United States Patent Office 3,410,924
Patented Nov. 12, 1968

3,410,924
SEPARATION PROCESS EMPLOYING
CUPROUS HALIDE SALTS
Egi Victor Fasce, Baton Rouge, La., assignor to Esso
Research and Engineering Company
No Drawing. Filed Sept. 19, 1966, Ser. No. 580,173
33 Claims. (Cl. 260—677)

ABSTRACT OF THE DISCLOSURE

Butenes or $C_{5+}$ monoolefins are employed as activators for cuprous halide sorbents in the recovery of ligands capable of forming 1:1 complexes with the sorbent. The process is conducted with the sorbent in a slurry of an essentially anhydrous organic liquid diluent, e.g., paraffins, aromatics and the monoolefin.

---

The present invention is directed to an improved process for recovering a complexable ligand capable of forming a stable 1:1 molar complex with a cuprous halide salt (Cl, Br or I) in enhanced purity from essentially anhydrous feeds containing them in lesser concentrations and lower purity by (A) contacting said feed with an essentially anhydrous slurry of cuprous halide salt particles selected from the group consisting of cuprous chloride, cuprous bromide, and cuprous iodide in an essentially anhydrous organic liquid diluent boiling higher than said ligand (and preferably also the other feed components) and containing a monoolefin liquid having at least two more carbon atoms than the ligand being recovered, said monoolefin being less preferentially complexable than said ligand, to complex said cuprous halide selectively with said ligand in the liquid phase, and (B) desorbing said complex in the presence of said organic liquid diluent to recover said ligand.

According to one preferred embodiment, the present invention is directed to a process for recovering a complexable ligand in enhanced purity from an essentially anhydrous feed containing it in lower purity wherein said ligand is capable of forming a stable complex with said cuprous halide salts having a mol ratio of copper to complexing ligand of 1:1, which comprises: (A) contacting said feed with an essentially anhydrous slurry of (1) solid, cuprous halide salt particles selected from the group consisting of cuprous chloride, cuprous bromide, and cuprous iodide in (2) an essentially anhydrous organic liquid diluent having a boiling point above the boiling point of said complexable ligand being recovered and containing a $C_{5+}$ monoolefin which is less preferentially complexable than said ligand to be recovered at temperatures and pressure conditions sufficient to effect liquid phase formation of a solid, insoluble cuprous halide-ligand complex, and (B) desorbing said solid complex in the presence of organic liquid diluent to recover said ligand. Of course, as noted hereinabove, the specific higher boiling less preferentially complexable monoolefin liquid (contained in the organic liquid diluent) which is used to recover a given 1:1 complexable ligand has at least two carbon atoms more than the ligand being recovered. Usually the desorption is conducted by heating the complex in the presence of the organic liquid diluent to thermally dissociate the complexed ligand therefrom.

According to another of the preferred embodiments of this invention, the liquid phase slurry complexation is conducted in a plurality of slurry-contacting steps sequentially performed which each succeeding liquid phase slurry complexing step being conducted at a lower temperature than the preceding one and with all of said complexing steps being conducted in the presence of said monoolefin-containing organic liquid diluent.

Certain prior art ligand separation processes for selectively removing complexable ligands from feed streams containing them are based on vapor phase selective complexing of the ligands to be removed followed by vapor phase decomplexing thereof to recoup the desired ligand. Although some of these processes employ cuprous halide sorbents having high porosity and activity for sorption, these prior art procedures often require at least several complexation stages to be performed with each complexing stage being conducted in a separate fixed or fluidized complexing bed in the vapor phase due to the highly exothermic nature of the complexation reaction, and the comparatively slow vapor phase reaction rate involved. In turn, each complexing bed must be internally cooled using a large number of cooling tubes internally disposed within each complexing bed to remove the heat of reaction. These tubes, of course, periodically require maintenance, cleaning, etc., to prevent complex bed reactor fouling. Moreover, such prior art procedures require a large inventory of cuprous halide sorbent compared to the process of this invention, since each vapor phase complexing bed must contain sufficient sorbent to insure the attainment of quantitative recovery goals.

Moreover, it has been noted in conjunction with vapor phase sorption procedures that the cuprous halide sorbents are subjected to fairly rapid loss of sorptive capacity and activity. Consequently, the once sorption-active cuprous halide sorbents must be reactivated on a fairly continual basis, which increases the cost of conducting vapor phase fixed or fluidized bed ligand recovery procedures. Thus, the conventional prior art vapor phase processes are very expensive, due to the abovementioned necessities of regenerating the capacity of the sorbent, maintaining conventional internal refrigeration, and maintaining a large inventory of cuprous halide sorbent particles throughout the processing. These increased maintenance, apparatus, refrigeration and inventory costs detract significantly from the economic incentive of high purity ligand recovered.

Total slurry recovery procedures have been tried in the prior art, viz., slurry procedures wherein both complexing and decomplexing are conducted in the presence of liquid slurry diluent. One type of procedure involves use of aqueous slurries to recover complexable ligands forming a 2:1 molar complex with cuprous chloride. Such aqueous slurry procedures have several drawbacks including corrosion of metal apparatus parts caused by the water in conjunction with cuprous chloride; disproportionation of the cuprous ion to copper and cupric ion; agglomeration of the cuprous chloride; degradation of the sorbent (cuprous chloride) caused by side reactions such as hydration, hydroxyl formation and oxidation, etc.

Another type of prior art slurry recovery process, as taught in Gilliland Patent 2,209,452, is designed to recover individual $C_2$, $C_3$ and $C_4$ complexable monoolefin ligands capable of forming 1:1 molar complexes with cuprous chloride from mixtures containing monoolefins and paraffins having the same carbon number, and employs raw cuprous chloride salt suspended in an inert solvent liquid, e.g., kerosene. The chief drawback to this procedure is that the raw cuprous chloride salt in such slurry environment is capable of reaching only low sorptive capacities, viz., below 40% of theoretical capacity. Also, the complexing rate achievable by said sorbent is very slow, viz., the rate of getting to said low sorptive capacity is slow. Moreover, such slurry recovery procedures frequently suffer from either comparatively low recovery of said monoolefinic ligands or commercially unacceptable improvement in purity of the product ligands recovered. Consequently, raw salt requirements are unusually high and inventory and equipment costs (due to the increased volume of salt required plus recycle and pumping facilities) for all practical purposes have in the past ruled out widespread acceptance of such non-aqueous slurry recovery processes.

The present invention, on the other hand, overcomes most, if not all, of the drawbacks present in the above-mentioned prior art recovery procedures. Thus, the present invention achieves high recoveries of product ligand in very good purity at fast complexation rates with good sorptive capacity and activity maintenance, exhibits little or no corrosion problems, evidences little or no debilitating agglomeration, does not require close control of sorbent particle size, reduces refrigeration requirements, sorbent inventory requirements, regeneration requirements, system maintenance and does not require either deliquification or drying of the sorbent particles at any stage of processing. Moreover, the present invention increases complexation rate and decomplexation rate without detracting from product purity. This allows more throughput and lessens apparatus costs. The reasons for the enhancement in complexation and decomplexation rate are not completely understood. However, it can be theorized plausibly that the presence of the $C_{5+}$ monoolefin acts as an activator for the cuprous halide salt and increases the accessibility of all parts (including the interior) of the cuprous chloride sorbent particles to the complexing ligand without dissolving the entire particle which could lead to extinction of the sorptive capacity of the cuprous halide sorbent, and definitely result in loss of slurry processing economies and efficiency. Thus, the present invention is readily capable of attaining $95+\%$ recovery of $C_2$ to $C_4$ monoolefins in purities of $99+\%$ with cuprous halide raw salt sorptive capacities of $55+\%$ and excellent activity maintenance over repeated use and at complexation rates significantly faster than the aforementioned prior art kerosene slurry recovery process.

It will be noted that the process of this invention exhibits great flexibility with respect to sorbent particle size since recovery and ligand purity are not tied to maintenance of a certain particle size limitation and distribution therein as is the case in some prior art vapor phase ligand recovery processes. Usually, however, cuprous halide raw salt particles are employed which are less than 200 microns in size in order to facilitate maintaining the slurry and pumping the slurry throughout the ligand recovery system.

These and other advantages of the present invention will be apparent from the description which follows.

The process of this invention can be conducted readily by passing the 1:1 complexable ligand-containing feed stream, either in gaseous or liquid form, in contact with a previously prepared slurry of said raw salt cuprous halide particles having an average particle size of less than 200 microns in an essentially anhydrous organic liquid diluent containing $C_{5+}$ mooolefin which has a boiling point higher than the boiling point of the complexable ligand and is less preferentially complexable with the sorbent than the ligands being recovered. The term less preferentially complexable as used herein in reference to the activator monoolefins, e.g. $C_{5+}$ monoolefins, includes essentially no complexing (those which for all practical purposes do not complex with the said cuprous halide sorbents). The less preferentially complexable monoolefin activator involved can be introduced with the feed (in gaseous or liquid form) and the requisite concentration thereof in the slurry liquid can thus be established (rather than establishing the slurry containing the liquid monoolefin prior to contact of the feed with the slurry). The complexation is conducted at liquid phase temperature and pressure conditions to form a solid cuprous halide-ligand complex which is essentially insoluble in the slurry liquid diluent medium. Subsequent to complexation, the complexed ligand is recovered from the cuprous halide-ligand complex by decomplexation thereof, the decomplexation occurring also in the presence of the $C_{5+}$ monoolefin-containing organic liquid slurry medium. Thus, it will be noted that the cuprous halide salt particles are kept in contact with the $C_{5+}$ monoolefin-containing diluent throughout the entire ligand recovery procedure, which involves in essence complexing (sorption) and decomplexing (desorption).

PREPARATION OF SLURRY

The working slurry can be prepared readily by adding the cuprous halide salt particles to the $C_{5+}$ monoolefin-containing organic liquid diluent and stirring during complexing (to insure adequate contact of the solid salt particles with the ligand-containing feed). The cuprous halide salt particles employed should be fairly dry, high purity, viz., $95+\%$ pure commercial cuprous chloride, cuprous bromide or cuprous iodide salts containing less than about 0.8% moisture. The preferred cuprous halide sorbents are cuprous chloride salts which are $99+\%$ pure cuprous chloride salt which is substantially moisture-free, viz., contains less than 0.5 wt. percent moisture (based on dry cuprous chloride).

According to one preferred embodiment, the organic liquid slurry diluent contains at least one $C_{5+}$ monoolefin (1) having a higher boiling point than the 1:1 ligand being recovered and (2) which is less preferentially complexable (if complexable at all) with said cuprous halide salt than the 1:1 ligand being recovered. Moreover, the organic liquid diluent is essentially anhydrous and, of course, contains no bulk water. Since the $C_{5+}$ monoolefin diluent, per se, as intended herein is not contained in the feedstream, it can be considered as "extraneous" with respect to the feedstream.

According to another embodiment of the invention, when the ligand recovered is ethylene, e.g., form a $C_2$ or $C_2$–$C_3$ refinery feed, the less preferentially sorbed monoolefin activator can be a $C_4$ monoolefin, e.g., a butene such as butene-1. In such cases, the $C_4$ monoolefin can be introduced into the organic liquid diluent, e.g., a $C_5$ to $C_7$ paraffin liquid by adding the $C_4$ monoolefin to the feed prior to contact of the feed with the slurry. Hence, the requisite desired concentrations of the $C_4$ monoolefin can thus be established in the slurry and maintained therein. In such a case, of course, the added $C_4$ monoolefin is not "extraneous" to the feedstream as altered to contain it prior to contact with the cuprous halide-paraffin slurry, but the $C_4$ monoolefin is "extraneous" to the "native" feedstreams, i.e., the $C_2$ and $C_2$–$C_3$ refinery feedstreams secured as distillation cuts.

The organic liquid diluent usually boils above 10° F., melts below 70° F., has a low viscosity at operating temperatures, dissolves less than about 5% of the cuprous halide salt and 1:1 complexes thereof and can be separated readily from the recovered product ligand in the final recovery procedure by simple distillation or flashing procedures whereby the product ligand is split off from the organic liquid diluent. The organic liquid diluent can consist entirely of a $C_{5+}$ monoolefin or mixture of $C_{5+}$ monoolefins, viz., 100 wt. percent thereof, or it can be comprised of $C_{5+}$ monoolefins and inert higher boiling organic liquid diluents, e.g., inert hydrocarbons and/or chlorinated hydrocarbons which are also higher boilers, viz., higher boiling than the ligand being recovered. The term "insert" as applicable to said other diluent components means that they do not interfere substantially in the complexing-decomplexing operations and do not react chemically with either the cuprous halide salt being employer or the ligand being recovered. Suitable $C_{5+}$ monoolefins which can be used are the $C_5$ to $C_{30}$ monoolefins, especially the $C_5$ to $C_{20}$ monoolefins. Examples of specific $C_5$ to $C_{20}$ monoolefins which can be employed include, but are not limited to, the following: pentene-1; hexene-1; heptene-1, 2,2,4-trimethyl pentene-1; 2,2,4-trimethyl pentene-2; octene-1, nonene-1, decene-1, undecene-1, 5-methyl-1, decene-1, dodecene-1; isomers and mixtures containing any two or more thereof. Suitable inert "other higher boiling" components which can also be present in the organic liquid diluent are $C_5$ to $C_{30}$ liquid paraffins, e.g., n-pentane, cyclopentane, cyclohexane, methyl cyclopentane, n-hexane, n-heptane, methyl cyclohexane, isoheptane, n-octane, 2,2,4-trimethyl pentane, 2,2,5-trimethyl pentane, n-nonane, n-decane, n-undecane, n-dodecane, n-hexadecanes, isomers and mixtures thereof; $C_6$ to $C_{30}$ mono and polycyclic aromatics and alkylated aromatics, especially $C_6$ to $C_{12}$ monocyclic aromatics containing up to six substituent carbon atoms, e.g., benzene, toluenes, xylenes, mesitylene, ethyl benzene and mixtures of said $C_6$ to $C_{12}$ monocyclic aromatics; aromatics including those containing in excess of 12 carbon atoms such as bicyclic, tricyclic and tetracyclic compounds, including, but not limited to: methyl naphthalenes, polymethyl anthracenes and phenanthrenes, chrysenes, etc.; narrow boiling naphthas corresponding in carbon number content and requisite properties to the abovementioned paraffins (individually or in admixture); halogenated organic diluents, e.g., ethyl chloride, ethyl bromide, carbon tetrachloride, propyl chloride, propyl bromide, butyl chloride, butyl fluoride, butyl bromide, amyl chloride, amyl bromide, amyl fluoride, as well as mixed halides such as difluoro dichloromethane, -ethane, and isomers and mixtures of any two or more of the abovementioned halogenated organic diluents; etc. The use of $C_5$ to $C_{12}$ paraffins and/or $C_6$ to $C_{12}$ monocyclic aromatics containing up to six alkyl substituent carbon atoms are preferred in accordance with this invention when the organic liquid diluent contains other higher boiling components.

As noted above, the $C_{5+}$ monoolefin-containing organic liquid diluent can contain other higher boiling inert liquid components. These components can be present in amounts up to 99 wt. percent based on the total organic liquid diluent. Usually said diluent contains at least 5 wt. percent $C_{5+}$ monoolefin "activator" in order to upgrade the sorptive capacity of the cuprous halide salt, accelerate complexing rate and aid in maintenance of sorptive activity. Bearing this in mind, the composition of the $C_{5+}$ monoolefin-containing organic liquid diluent can range as follows:

|  | Can Use | Usually Use | Prefer |
|---|---|---|---|
| Wt. percent $C_{5+}$ monoolefin | 1–100 | 5–90 | 10–75 |
| Wt. percent "Other higher boilers" | 99–0 | 95–10 | 90–25 |

Usually the cuprous halide salt particles have average particle sizes of less than about 200 microns with characteristically individual particles ranging in size from about 0.05 to about 400 microns. Preferably the average particle size of the sorbent particles is less than about 100 microns with characteristically average individual particles ranging in size from about 0.1 to about 250 microns. Moreover, the slurry contacted with the feed stream contains from 10 to about 65 wt. percent of the cuprous halide salt, based on the total of slurry solids and liquids. The cuprous halide salt and organic liquid diluent should both be essentially anhydrous and definitely free from any bulk water. The feed stream should also be essentially water-free and should not contain more than about 300 parts per million water and preferably less than 100 parts per million water. The concentration of said $C_{5+}$ monoolefin-containing organic liquid diluent in the slurry based on the total cuprous halide solids therein ranges from 40 to 900 wt. percent. Of course, the concentration of the sorption-active cuprous halides solids in the slurry medium after contact with the feed stream will be less than that present in the slurry composition prepared prior thereto because of the increase in weight of the total working slurry, viz., cuprous halide salt slurry plus feed stream, due to the weight of the feed stream. As noted hereinabove, the feed stream can be contacted with the slurried sorbent solids with feed stream in gaseous form, i.e., by bubbling the feed stream into the slurry of sorption-active cuprous halide particles and organic liquid diluent. As long as the slurry complexing is conducted in the liquid phase, the feed stream can be passed into contact with the slurry in either gaseous or liquid form.

COMPLEXING

The liquid phase slurry complexing can be carried out in one or a series of steps at any temperature and pressure conditions which yield liquid phase complexation. Of course, the specific complexing temperatures and pressures employed during the slurry liquid phase complexation will depend mainly upon the specific ligand being recovered and the specific feed stream in which the ligand is present. Usually it is desirable (despite the boiling point of the ligand being recovered and the boiling point of the $C_{5+}$ monoolefin-containing organic liquid diluent) to conduct complexing and decomplexing at a temperature below the annealing temperature at which the cuprous halide salt solids tend to stick together or agglomerate. Bearing this in mind, complexing is usually conducted at temperatures ranging from −80 to 180° F. and comparable pressures of 0 to 500 p.s.i.g. According to a preferred embodiment of this invention, the complexing is conducted in a series of slurry contacting steps wherein each succeeding liquid phase slurry complexing step is conducted at a lower temperature than the one preceding it, with all said steps being conducted in the presence of the $C_{5+}$ monoolefin-containing organic liquid diluent.

STRIPPING

While it is not necessary to conduct stripping operations when the feed stream initially contains reasonably high concentrations of the ligand to be recovered, e.g., >20 wt. percent thereof; it is frequently desirable to employ stripping when the feed stream contains said ligand in low concentrations and especially where the feed stream contains an additional component having a boiling point close to that of the primary ligand to be recovered.

The stripping can be accomplished by heating the complexed slurry at temperatures which are at or below, and preferably from 150 to 5° F. below, the decomplexing (desorption) temperatures to be employed in subsequent decomplexing step. Any organic liquid diluent lost during stripping can be recovered by splitting the diluent from the stripping gas at appropriate conditions of temperature and pressure. According to one embodiment of the present invention, the stripping can be performed using a material which in itself is complexable with cuprous halide salt particles, e.g., the very complexable ligand being recovered. Stripping can also be conducted by washing the stripping column counter-currently with any suitable liquid or gaseous stripping material which can include a ligand less preferentially complexable with the cuprous halide salt particles as long as the stripping is conducted at temperatures and pressures which do not cause significant decomplexation of the previously complexed desired ligand to be recovered from the feed stream. The stripping can also be conducted by counter-current liquid washing or gaseous stripping using inert hydrocarbons, especially inert $C_5$ to $C_{12}$ paraffins, nitrogen, nitrogen-containing mixtures, etc. Moreover, various combinations of stripping agents can be used. Of course, if slurry stripping is done, the slurry stripping is always in the presence of the $C_{5+}$ monoolefin-containing organic liquid diluent as a liquid.

DECOMPLEXING

The complexed (and optionally stripped) cuprous halide slurry solids are then subjected to decomplexation (desorption) to desorb and recover the previously sorbed ligand therefrom. Decomplexing can be accomplished at any suitable temperatures and pressures as long as they are below the boiling point of the $C_{5+}$ monoolefin-containing organic liquid diluent. Usually, however, decomplexing is conducted at conditions which do not cause severe thermal annealing agglomeration of the cuprous halide particles. Of course, the decomplexing must also be conducted at temperatures and pressure conditions wherein the organic liquid diluent remains in the liquid state. In this regard it should be clearly understood that the organic liquid diluent remains in the liquid state throughout the entire process, viz., during complexing, stripping, decomplexing, and splitting operations. The decomplexed slurry can then be recycled for repeated use in complexing more 1:1 ligand from the feed. Moreover, repeated recycling of the same cuprous halide salt-$C_{5+}$ monoolefin containing organic liquid diluent slurry over extended periods is possible with the present invention because the presence of the $C_{5+}$ monoolefin activator enhances sorptive capacity and aids in maintaining it.

If, however, after long usage the sorptive activity and sorptive capacity of the slurried solids decreases to such a level as to severely restrict efficient recovery operations, the sorptive activity and capacity of the cuprous halide solids can be regenerated by complexing them with a "conditioning ligand" capable of forming a >1:1 molar complex with said cuprous halide, viz., a ligand capable of forming a stable complex wherein the complex has a mole ratio of copper to complexing ligand of greater than 1:1, followed by decomplexation thereof. This complexing and decomplexing can be done either in the vapor phase or by slurry complexing and decomplexing. The complexing operation imparts to the raw salt the requisite sorptive capacity and activity upon decomplexing thereof by creating pores in the salt. This desorption is usually conducted thermally by heating the previously complexed raw salt to thermally dissociate the complex therefrom, thus leaving the sorption-active cuprous halide sorbent particles. After this "conditioning ligand" treatment, the cuprous halide sorbent solids will have a highly porous structure, have a porosity of above about 10% (of the total volume of a particle) 550 to 10,000 A. pores, as determined by mercury porosimeter measurements. Suitable "conditioning ligands" which can be utilized usually form stable complexes having a mole ratio of copper to conditioning ligand of 2:1 or even higher. Such compounds include both materials which form only complexes having said ratios of copper to complexing compounds greater than 1:1 and also compounds which form complexes having a ratio of 1:1 or less, which upon decomplexing pass through a stable complex having a ratio of copper to complexing compound greater than 1:1, and preferably of 2:1 and even higher as indicated above. Thus, certain materials, e.g., nitriles, diolefins, acetylenes, carbon monoxide, etc., under ordinary conditions forming a 2:1 complex can be made to complex in ratios of copper to complexing compound of 1:1 or less. However, upon dissociation, complexing material is released selectively from a bed of cuprous halide until the stable complex, viz., thte complex having a copper to conditioning ligand mole ratio above 1:1, e.g., 2:1 stoichiometric complex is completely formed before further decomplexing to the uncomplexed (sorption-active) cuprous halide sorbent particles occurs. In this specification by "stable complex" is meant a stoichiometric complex stable upon dissociation as described in the preceding sentence (and this holds for both the 1:1 and >1:1 complexes). Such "conditioning ligands" which can be employed include, but are not limited to, the following: $C_3$ to $C_{10}$ conjugated and nonconjugated aliphatic, cyclic, and alicyclic polyolefins, e.g., butadiene-1,3, isoprene, piperylene, allene, octadiene, cyclohexadiene, cyclooctadiene, divinylbenezene, cyclododecatriene, $C_2$ to $C_{10}$ aliphatic and alicyclic acetylenes, or acetylenes containing additional unsaturation, e.g., acetylene, methylacetylene, propylacetylene, phenylacetylene, vinylacetylene, etc.; $C_2$ to $C_{10}$ and higher unsaturated or saturated aliphatic or alicyclic nitriles, e.g., acetonitrile, acrylonitrile, propionitrile, phenylnitrile, methacrylonitrile, ethacrylonitrile, etc.; carbon monoxide; HCN, etc. Of course, more than one of these functional groups can be present in a single molecule of the "conditioning ligand." After the sorptive capacity and activity of the cuprous halide slurry solids has been regenerated, they can be recycled to further use. Of course, if the cuprous halide solids were deliquified and "conditioned" by vapor phase complexing-decomplexing, the "conditioned" solids will be slurried again in the $C_{5+}$ monoolefin-containing organic liquid diluent before recycling them for further use in recovering more 1:1 complexable ligand from the feed stream containing it.

According to another embodiment of this invention, as mentioned above, ethylene can be recovered selectively from essentially anhydrous $C_2$ and $C_2$-$C_3$ refinery streams using an essentially anhydrous slurry of said cuprous halide salt particles (preferably cuprous chloride) in an essentially anhydrous organic liquid diluent having a boiling point higher than the ligand being recovered selectively, i.e., ethylene, and containing a monoolefin liquid having at least two more carbon atoms than the ligand being recovered selectively. Thus, butenes, pentenes, etc., can be used as said monoolefin liquid as butenes are less preferentially complexable with said cuprous halides than is ethylene. Of course, the slurry complexing is done liquid phase and slurry decomplexing is conducted in the presence of said organic liquid diluent containing the butene monoolefin liquid (which can be present in the original slurry at start-up or incorporated therein by addition to the ethylene-containing feed prior to contact with the slurry). When butenes are used, the desorbed slurry (composed of desorbed cuprous halide solids plus the butene-containing organic liquid diluent) is recycled to liquid phase complexing for further use in recovering ethylene selectively from fresh ethylene containing $C_2$ or $C_2$-$C_3$ refinery stream feed. It will be noted that despite recycle of the butene-containing slurry, no build-up of butenes occurs. Consequently, the concentration of of butenes, based on total organic liquid diluent in the slurry, remains substantially the same throughout repeated slurry complexing (viz. ±10 wt. percent due to evaporation, make-up additions, etc.). As is the case with $C_{5+}$ monoolefin liquids, the organic liquid diluent should contain at least 5 wt. percent butenes in such ethylene slurry recovery procedures.

The ethylene slurry recovery process can be conducted continuously or intermittently using butene slurries. The continuous recovery process is characterized by continuous feed of the ethylene-containing feed, coupled with continuous slurry complexing and desorption (with or without continuous stripping between complexing and desorption); and the butenes concentration in the organic liquid diluent remains substantially the same throughout complexing and desorption.

Alternatively, the ethylene slurry recovery process can be conducted intermittently, i.e., batchwise. For example, fresh feed is intermittently slurry complexed and slurry desorbed, and the slurry complexing (or at least a major portion of it) can be conducted in at least one captive slurry complexing zone. This involves charging the captive zone, e.g, slurry tank, with the cuprous halide salt and butene-containing organic liquid diluent. Then the ethylene-containing feed is introduced into said slurry and liquid phase slurry complexing is conducted to complex the ethylene selectively. The temperature of the captive complexed slurry is then raised to decomplexing conditions and the ethylene is desorbed from the complexed solids. If stripping is conducted, e.g., using ethylene, nitrogen, etc. as the stripping medium, the stripping is performed on the complexed slurry prior to desorption thereof. In any event both slurry complexing and slurry desorption are conducted in the same zone. Hence, the slurry is "captive" during complexing and decomplexing in such an intermittently conducted ethylene slurry recovery procedure. The captive desorbed slurry is then ready for receiving fresh ethylene-containing feed at which time complexing conditions of temperature and pressure are imposed.

Whether the ethylene slurry recovery procedure is conducted continuously or batchwise, slurry complexing can be staged, viz., conducted in a plurality of sequential liquid phase slurry complexing steps with each succeeding liquid phase slurry complexing step being conducted at a lower temperature than the preceding one; all such steps being conducted in the presence of the butene-containing organic liquid diluent.

As is the case with the $C_{5+}$ monoolefins, the butene-containing organic liquid diluent can be composed entirely of butenes, e.g., butene-1, isobutylene, butene-2 or a mixture thereof; or said diluent can contain at least 1 wt. percent butenes with the remainder being liquid paraffins, liquid aromatic hydrocarbons, mixtures of paraffins and aromatics, etc., as long as said paraffins and aromatic hydrocarbons remain liquid at conditions of complexing and desorption. The same paraffins and aromatic hydrocarbons referred to hereinabove for use with $C_{5+}$ monoolefins can be used to recover ethylene when using butenes and in the same comparative concentration ranges with butenes as tabulated hereinbefore with respect to the $C_{5+}$ monoolefins. In fact, when butene-1 is used as the activator monoolefin in an ethylene slurry recovery process using a $C_{5+}$ paraffin or $C_6$–$C_{12}$ monocyclic aromatic as the other organic liquid diluent, experiments show that less butene-1 can be employed to accomplish excellent activation of raw salt cuprous halide for ethylene sorption. Thus, while at least 1 wt. percent butene-1 is used at lined out conditions, very satisfactory results are readily secured using from 2 to 10 wt. percent butene-1. Moreover, as noted above, the concentration of butene-1 in the slurry liquid can be established and maintained by adding butene-1, as a gas or liquid, to the ethylene-containing feedstream before complexation.

The present invention can be used to recover any complexable ligand capable of forming a stable 1:1 molar complex with the said cuprous halide salts as long as said ligand complexes preferentially to the specific activator monoolefin "activator" in the organic liquid slurry diluent. Thus, $C_2$ to $C_4$ monoolefins, such as ethylene, propylene, butenes (butene-1, butene-2 and isobutene) can be recovered readily from feed streams containing them. The present invention is especially well suited to ethylene recovery. Of course, this invention can be used to recover other compounds which are monoolefinically unsaturated as well, e.g., compounds containing a vinyl group, such as, styrene (vinyl benzene), vinyl toluene, vinyl cyclohexane; unsaturated aldehydes, unsaturated alcohols, unsaturated esters, unsaturated acids, e.g., allyl alcohols, acrolein, acrylic acid, methacrylic acid and the $C_1$ to $C_8$ alkyl acrylates and alkyl methacrylates (methyl acrylate, ethyl acrylate, methyl methacrylate, ethyl methacrylate); amines, halogenated olefins, e.g, vinyl chloride, chlorobutenes, allyl halides such as allyl chlorides; etc.

The present invention will be illustrated in great detail in the examples which follow. It should be realized, however, that the following examples are intended to be illustrative rather than limiting. All percents (%) are by weight unless otherwise indicated.

Example 1 (Comparative recoveries of ethylene from $C_2$ streams using a paraffin slurry diluent with and without a $C_{5+}$ monoolefin "activator" diluent)

Fifty weight percent slurries of raw cuprous chloride (Bowers 99+% pure moisture-free) salt are prepared in two different slurry diluents by adding the raw salt to the liquid slurry diluent. One diluent contains 25 wt. percent hexene-1 with the remainder being n-heptane. The other diluent was pure n-heptane. An ethylene feed stream containing 48.2 wt. percent ethylene and 51.8 wt. percent nitrogen is contacted with both slurries by bubbling the feed into the slurries and complexing at 30° F. and 200 p.s.i.g. pressure for one hour residence time. Then the complexed slurry is depressured to 100 p.s.i.g. and stripped with pure ethylene gas to remove the nitrogen. Following stripping, the complexed, stripped slurry is heated at 75° F. and 100 p.s.i.g. and decomplexed over a 75 to 80° F. range for one hour. The sorptive capacity (percent solids capacity) and other pertinent run conditions are tubulated hereinbelow:

| Run | A | B | C | D | E |
|---|---|---|---|---|---|
| Diluent | 100% n-heptane | | 25% hexene-1 in n-heptane | | |
| Wt. Percent Slurry | 50 | 50 | 50 | 50 | 50 |
| Ethylene Complexed, Moles. | 1.69 | 1.79 | 4.15 | 3.33 | 3.2 |
| Percent Solids Capacity. | 30 | 32 | 74 | 59.5 | 57.0 |

Runs C–E clearly establish the superiority of the slurry process of this invention using a $C_{5+}$ monoolefin activator because it allows greater recovery of the product ligand sought to be recovered and greatly enhances the sorptive capacity of the cuprous halide salt.

Example 2 (Ethylene recovery from an ethylene-containing stream by contact with a pentene-1 slurrry of cuprous chloride)

A slurry of 50 wt. percent cuprous chloride raw salt in pentene-1 (560 g. each) is charged to a stirred autoclave held at 5° F. A gaseous feed stream of 50% ethylene in nitrogen is bubbled through the slurry against an outlet pressure regulator holding the reactor contents at 206 p.s.i.g. The concentration of ethylene in the exist gas remains at about 6%, which is within 1% of what would be predicted from the dissociation pressure of the ethylene-cuprous chloride complex. This composition of exit gas is maintained for 45 minutes and then the ethylene concentration rises sharply to the feed value. The slurry is then depressured to 85 p.s.i.g. and stripped with pure ethylene to remove $N_2$. Decomplexing is carried out at 75–77° F. and 85 p.s.i.g. to recover high purity (>99%) ethylene. The solids loading obtained is 52% of the theoretical 1:1 complex obtained with ethylene, viz., sorptive capacity for ethylene of 52% of theoretical.

Example 3 (Propylene recovery from a $C_3$ stream by staged contact with a heptene-1 slurry of cuprous chloride)

A slurry of 50 wt. percent of cuprous chloride raw salt in a mixture of heptane and heptene-1 (50:50 by weight) is charged to a stirred autoclave held at −20° F. Crude propylene containing 95.8% propylene, 3.8% propane, and 0.4% of allene plus methylacetylene is bubbled through the slurry against a back pressure regulator holding the reactor contents at 15 p.s.i.g. The concentration of propylene in the exit gas is about 9%, giving a recovery of about 95% of the propylene in the feed. This exit gas is then bubbled through a second stage of complexation at −40° F. to increase overall recovery of the propylene to >98%. After breakthrough of the feed composition, the reactors are heated to 3° F. and purged with pure propylene at atmospheric pressure to remove unreacted feed from the slurry. Decomplexing is carried out at 1 atmosphere pressure and 32° F. to recover high purity (>99%) propylene. The solids loading is 45% of the theoretical 1:1 complex formed between CuCl and propylene.

Example 4 (1-butene recovery from a $C_4$ stream by contact with a slurry of cuprous chloride raw salt in "diisobutylene" and isooctane)

A slurry of 50 wt. percent of cuprous chloride in a 50:50 mixture of isooctane and "diisobutylene" (a 50:50 by weight mixture of 2,2,4-trimethylpentene-1 and 2,2,4-trimethylpentene-2) is charged to a stirred autoclave held at −40° F. A synthetic feed containing 40% butene-1, 10% n-butane, and 50% nitrogen is bubbled through the slurry at a pressure of 150 p.s.i.g. The slurry liquid is then replaced by 3 countercurrent washes with a fresh mixture of isooctane and "diisobutylene" at −40° F. The temperature is then raised to 100° F. and the pressure reduced to atmospheric. The complexed 1-butene is released and recovered. The recovered butene-1 evidences a solids loading (sorptive capacity) of 61% of theoretical.

Example 5 (Styrene recovery from ethyl benzene by contact with a slurry of cuprous chloride in tetradecene-1)

A slurry of 34 wt. percent cuprous chloride raw salt in tetradecene-1 is charged to an autoclave at −15° F. A synthetic feed containing 50:50 (wt. ratio) styrene and ethylbenzene is added to the slurry and held for one hour at −15° F. The slurry liquid is replaced three times with fresh tetradecene-1, cooled to −15° F., and then heated to 95° F. The slurry liquid is then removed and separated. A 90% styrene-10% ethyl benzene fraction is obtained which corresponds to a recovery of 77% of the styrene in the feed.

Example 6 (Vinyl chloride recovery from ethyl chloride by contact with a decene-1 slurry of cuprous chloride)

A slurry of 50 wt. percent cuprous chloride in decene-1 is prepared and held in a stirred autoclave at 80° F. and atmospheric pressure. A stream of nitrogen containing 10% vinyl chloride and 5% ethyl chloride is bubbled through the slurry. The vinyl chloride is selectively complexed to give 80% recovery from the feed stream. After breakthrough of the feed composition, the slurry is stripped for one hour at atmospheric pressure with nitrogen containing 10% vinyl chloride to remove dissolved unreacted ethyl chloride. Decomplexation is carried out at 200° F., using nitrogen as a stripping gas, and the product vinyl chloride is condensed in a Dry Ice trap. Analysis by gas chromatography reveals no ethyl chloride in the vinyl chloride product.

Example 7 (Ethylene recovery from a simulated $C_2$ feedstream by contact with a heptane-butene-1 slurry of cuprous chloride)

A slurry of 50 wt. percent cuprous chloride raw salt in n-heptane is prepared and held in a stirred autoclave at −30° F. and 200 p.s.i.g. Butene-1 is added to the slurry by admixture with the $C_2$ ethylene-containing feed. The adjusted feed contains 42.3 wt. percent ethylene, 42.6 wt. percent nitrogen and 15.1 wt. percent butene-1.

The feed gas is contacted with the slurry at a feed rate of twelve cubic feet per hour and complexing is conducted at −30° F. and 200 p.s.i.g. for approximately one hour. The complexing rate for ethylene is approximately 0.103 mol ethylene complexed per minute, which rate is maintained for slightly over 30 minutes of the total one hour complexing period.

After complexing, the slurry is depressured to 100 p.s.i.g. at −30° F. to yield 0.27 cubic foot of exit gas containing approximately 26.6 wt. percent ethylene, 1.1 wt. percent butene-1, and 72.3 wt. percent nitrogen (26.79 mol percent ethylene, 0.54 mol percent butene-1, and 72.64 mol percent nitrogen).

Then the slurry is stripped using 99.99 mol percent pure ethylene at −30° F. and 100 p.s.i.g. pressure for one hour. The exit gas from stripping (4.33 cubic feet) contains 91.1 wt. percent ethylene, 1.3 wt. percent butene-1, 6.9 wt. percent nitrogen and 0.7 wt. percent others, such as propene and propane which were probably present as impurities in the butene-1. On a mol percent basis the exit gas contained 91.99 mol percent ethylene, 0.64 mol percent butene-1, 6.99 mol percent nitrogen and 0.46 mol percent others.

The stripped slurry is then heated in two stages over 36 minutes to raise its temperature from −30° F. to 70° F. at 100 p.s.i.g., primarily to remove dissolved ethylene from the liquid slurry diluent. The first stage of heating involves raising the slurry temperature from −30° F. to 25° F. over a 16 minute period. The exit gas (2.48 cubic feet) from this stage contained 98.65 mol percent ethylene, 0.89 mol percent butene-1, 0.46 mol percent "others" and no nitrogen. The second stage of heating involves raising the temperature of the slurry from 25° F. to 70° F. over 20 minutes time. The exit gas (0.65 cubic foot) contains 97.47 mol percent ethylene, 1.81 mol percent butene-1, 0.64 mol percent "others" and no nitrogen.

Then the slurry solids are desorbed thermally over two heating stages by heating from 70 to 80° F. at 100 p.s.i.g. for approximately 32 minutes. The first stage of desorption is conducted by heating the slurry from 70 to 78° F. over a 21 minute period. The exit desorbate gas secured (3.16 cubic feet) contains 96.78 mol percent ethylene, 2.76 mol percent butene-1 and 0.46 mol percent "others." The second stage of desorption is conducted by heating said partially desorbed slurry from 78 to 80° F. over a period of 11 minutes. The exit desorbate gas (1.22 cubic feet) contains 96.76 mol percent ethylene, 2.8 mol percent butene-1 and 0.44 mol percent "others."

Following this desorption, the pressure is reduced from 100 p.s.i.g. to atmospheric. The exit gas (1.05 cubic feet) obtained during this pressure reduction contains 97.35 mol percent ethylene, 2.59 mol percent butene-1 and 0.06 mol percent "others."

The overall recovery of ethylene (including stripping gas) is approximately 92%, and the cuprous chloride solids have a sorptive capacity for ethylene, in the above complexing-stripping-desorption cycle, of 87.8% of theoretical, based on the 1:1 molar CuCl-ethylene stoichiometric complex. Their overall sorptive capacity (based on total materials sorbed) is 90.3%. Hence, it is clearly apparent that the presence of butene-1 as an activator monoolefin greatly enhances the capacity of raw cuprous chloride salt for selectively sorbing ethylene from feedstreams containing it. A comparison of the results secured with butene-1 versus a 100 wt. percent n-heptane slurry of raw cuprous chloride salt in ethylene slurry recovery procedures reveals a sorptive capacity for ethylene of approximately 88% with butene-1 versus sorptive capacities of about 31% when no monoolefin activator is used (Runs A and B of Example 1). Similar improvements are attainable with other butenes, e.g., isobutylene and butene-2 as well as mixtures of butenes.

While the present invention has been illustrated in great detail in the preceding examples, it should be understood that the present invention should not be limited to the specific details, e.g., diluents, $C_{5+}$ monoolefin raw salt capacity activators, and 1:1 complexable ligands contained therein. Of course, other diluents can be used, other ligands can be recovered and other complexing, stripping and decomplexing conditions can be used as will be noted from the discussion preceding the examples. Therefore the invention should be limited only by the claims which follow.

What is claimed is:

1. A slurry process for recovering ethylene selectively from an essentially anhydrous ethylene-containing feed selected from the group consisting of $C_2$ refinery streams and $C_2$–$C_3$ refinery streams which comprises (A) contacting (1) an essentially anhydrous slurry of (a) cuprous halide salt particles selected from the group consisting of cuprous chloride, cuprous bromide and cuprous iodide in (b) an essentially anhydrous organic liquid diluent having a boiling point higher than the ligand being recovered selectively and containing a monoolefin liquid having at least two more carbon atoms than the ligand being recovered selectively, said monoolefin liquid being less preferentially complexable than said selectively recovered ligand, and (2) said ethylene-containing feed at temperature and pressure conditions sufficient to effect liquid phase complexing of ethylene selectively with said cuprous halide in the presence of said monoolefin liquid; (B) desorbing said ethylene-cuprous halide complex in the presence of said monoolefin liquid-containing organic liquid diluent to recover ethylene selectively; and (C) recycling said desorbed slurry composed of said desorbed cuprous halide particles and said monoolefin liquid-containing organic liquid diluent to said liquid phase slurry complexing for further use in recovering ethylene selectively from fresh feed.

2. A process as in claim 1 wherein said monoolefin liquid is present in a concentration of at least 5 wt. percent, based on total organic liquid diluent.

3. A process as in claim 1 wherein said monoolefin liquid contains 4 carbon atoms.

4. A process as in claim 1 wherein the concentration of said monoolefin liquid based on total organic liquid diluent remains substantially the same throughout complexing and decomplexing.

5. A process as in claim 4 wherein fresh feed is intermittently complexed and desorbed as in (A) and (B) with the proviso that said slurry complexing (A) is conducted in at least one captive slurry complexing zone.

6. A process as in claim 1 wherein said complexing and desorption are conducted continuously, said ethylene-containing feed being continuously fed, and the concentration of said monoolefin liquid based on total organic liquid diluent being substantially the same throughout complexing and desorption.

7. A process as in claim 1 wherein said cuprous halide is cuprous chloride.

8. A process as in claim 1 wherein said liquid phase slurry complexing is conducted in a plurality of sequential liquid phase slurry complexing steps, each succeeding liquid phase slurry complexing step being conducted at a lower temperature than the preceding one with all said steps being conducted in the presence of said monoolefin-containing organic liquid diluent.

9. A process as in claim 1 wherein said organic liquid diluent also contains a paraffin which remains liquid at conditions of complexing and desorption.

10. A process as in claim 1 wherein said organic liquid diluent also contains an aromatic hydrocarbon which remains liquid at conditions of complexing and desorption.

11. A process as in claim 1 which includes stripping the complexed slurry in the presence of said organic liquid diluent prior to desorption thereof.

12. A slurry process for recovering ethylene selectively from an essentially anhydrous ethylene-containing feed selected from the group consisting of $C_2$ refinery streams and $C_2$–$C_3$ refinery streams which comprises (A) contacting (1) an essentially anhydrous slurry of (a) cuprous chloride salt particles in (b) an essentially anhydrous organic liquid diluent having a boiling point higher than any component in said feed and containing at least 5 wt. percent butene, based on total organic liquid diluent, and (2) said ethylene-containing feed at temperature and pressure conditions sufficient to effect liquid phase complexing of ethylene selectively with said cuprous halide in the presence of said butene-containing organic liquid diluent; (B) desolving said ethylene-cuprous chloride complex in the presence of said butene-containing organic liquid diluent to recover ethylene selectively; and (C) recycling said desorbed slurry composed of desorbed cuprous chloride particles and butene-containing organic liquid diluent to said liquid phase slurry complexing for further use in recovering ethylene selectively from fresh feed.

13. A process as in claim 12 wherein the concentration of butene, based on total organic liquid diluent in the slurry, remains substantially the same throughout continuous complexing and desorption on continuously fed fresh feed.

14. A slurry process for recovering complexable ligand which comprises (A) contacting (1) an essentially anhydrous slurry of (a) cuprous halide salt particles selected from the group consisting of cuprous chloride, cuprous bromide and cuprous iodide in (b) an essentially anhydrous organic liquid diluent having a boiling point higher than the complexable ligand being recovered and containing a $C_{5+}$ monoolefin having at least two more carbon atoms than said ligand and being less preferentially complexable than said ligand and (2) an essentially anhydrous feed containing a complexable ligand capable of forming a stable complex with said cuprous halide having a mol ratio of copper to complexing ligand of 1:1 at temperature and pressure conditions sufficient to effect liquid phase complexing of said ligand selectively with said cuprous halide salt in the presence of said $C_{5+}$ monoolefin, and (B) desorbing said complex in the presence of said organic liquid diluent to recover said ligand.

15. A process as in claim 14 wherein said cuprous halide is cuprous chloride.

16. A process as in claim 14 wherein said $C_{5+}$ monoolefin is a $C_5$ to $C_{20}$ monoolefin.

17. A process as in claim 14 wherein said $C_{5+}$ monoolefin-containing organic liquid diluent also contains a liquid $C_{5+}$ paraffin.

18. A process as in claim 14 wherein said $C_{5+}$ monoolefin-containing organic liquid diluent also contains a liquid aromatic hydrocarbon.

19. A process as in claim 4 wherein said $C_{5+}$ monoolefin is present in a concentration of at least 5 wt. percent based on total organic liquid diluent.

20. A process as in claim 14 wherein said complexable ligand recovered is a $C_2$ to $C_4$ monoolefin.

21. A process as in claim 20 wherein said monoolefin ligand recovered is ethylene.

22. A process as in claim 20 wherein said monoolefin ligand recovered is propylene.

23. A process as in claim 20 wherein said monoolefin ligand recovered is a butylene.

24. A process as in claim 17 wherein said paraffin contains from 5 to 30 carbon atoms.

25. A process as in claim 18 wherein said aromatic hydrocarbon contains from 6 to 30 carbon atoms.

26. A process as in claim 25 wheerin said aromatic hydrocarbon is a $C_6$ to $C_{12}$ monocyclic aromatic hydrocarbon contaning up to 6 alkyl substituent carbon atoms.

27. A process as in claim 14 wherein said complexable ligand recovered contains a vinyl group.

28. A process as in claim 14 wherein the average particle size of the cuprous solids ranges from 0.1 to $200\mu$.

29. A process as in claim 14 which includes stripping the complexed slurry in the presence of the $C_{5+}$ monoolefin-containing organic liquid diluent prior to desorption thereof.

30. A process as in claim 14 wherein the desolved slurry from (B) is recycled to said liquid phase complexing (A).

31. A process as in claim 30 wherein the desorbed slurry from (B) is regenerated by complexing with a conditioning ligand capable of forming a $>1:1$ molar complex with said cuprous halide followed by decomplexation thereof prior to recycling said slurry to said liquid phase complexing (A).

32. A process as in claim 31 wherein said conditioning ligand is butadiene-1,3.

33. A process as in claim 14 wherein said liquid phase slurry complexing is conducted in a plurality of sequential liquid phase slurry complexing steps, each succeeding liquid phase slurry complexing step being conducted at a lower temperature than the preceding one with all said steps being conducted in the presence of said $C_{5+}$ monoolefin-containing organic liquid diluent.

References Cited

UNITED STATES PATENTS

| | | | |
|---|---|---|---|
| 2,376,239 | 5/1945 | Evans et al. | 260—677 |
| 2,209,452 | 7/1940 | Gilliland | 260—677 |

DELBERT E. GANTZ, *Primary Examiner.*

J. D. MYERS, *Assistant Examiner.*